United States Patent
Khan et al.

(10) Patent No.: US 6,776,529 B2
(45) Date of Patent: *Aug. 17, 2004

(54) ANTIWEAR LUBRICATION COATING FOR BEARING SURFACES FOR HYDRODYNAMIC FLUID BEARINGS

(75) Inventors: Raquib Uddin Khan, Pleasanton, CA (US); Gregory Ian Rudd, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 10/068,099

(22) Filed: Feb. 5, 2002

(65) Prior Publication Data

US 2003/0147569 A1 Aug. 7, 2003

Related U.S. Application Data

(63) Continuation of application No. 09/067,611, filed on Apr. 28, 1998, now Pat. No. 6,394,654.

(51) Int. Cl.[7] .............................................. F16C 17/10
(52) U.S. Cl. ....................... 384/107; 384/110; 384/115
(58) Field of Search ................................ 384/115, 114, 384/118, 113, 107, 110

(56) References Cited

U.S. PATENT DOCUMENTS

| 5,310,263 A | * | 5/1994 | Lee et al. | 384/100 |
| 5,957,587 A | * | 9/1999 | Hong | 384/108 |
| 6,394,654 B1 | * | 5/2002 | Khan et al. | 384/114 |

* cited by examiner

Primary Examiner—Lenard Footland
(74) Attorney, Agent, or Firm—Raghunath S. Minisandram; Jesus Del Castillo

(57) ABSTRACT

A very thin lubricant coating is applied to one or both of the facing surfaces defining the gap of a hydrodynamic bearing to prevent wear of these surfaces. The lubricant film is necessarily very thin, in the range of about 10 Å to 1000 Å, so that the film is thin enough that it does not materially affect the performance of the hydrodynamic bearing gap which is about typically 1–10 µm. The thin lubricant film could be a perfluoropolyether (PFPE) or a mixture of PFPE or a phosphazine derivative. To improve the adhesion and lubricating performance, functional PFPE can be used. For pure metallic surface like steel, phosphate esters can also be used because of its affinity with the metallic surface, e.g., ferrous. For example, the film could be PFPE, or a mixture of PFPE and a phosphazine derivative. The lubricant should be chosen to be thermally stable, and non-reactive with the typical ambient environment. The lubricants also have to have very low vapor pressure so that it lasts for the life of the bearing, as it will be applied only once during the manufacturing process. As an alternative, particularly if one of the surfaces of the bearing gap is ferrous, a phosphate ester could be used. Particularly with this type of coating, the surface of the hydrodynamic bearing could be quenched in the phosphate ester to provide the desired thin lubricant coating thereon. A thin film of phosphate esters without quenching can also be a effective wear protective coating. The thin lubricant film can be applied to both metallic surfaces as well as surfaces with hard coatings. The use of a hard coating allows for the usage of free machining or soft material which itself is vulnerable to wear degradation; the use of a thin lubricant film safeguards the hard coating from wear failure.

20 Claims, 4 Drawing Sheets

ANTIWEAR LUBRICATION COATING FOR BEARING SURFACES FOR HYDRODYNAMIC FLUID BEARINGS

CROSS-REFERENCE TO RELATED APPLICATION

This continuation application claims priority to U.S. application Ser. No. 09/067,611 filed Apr. 28, 1998 now U.S. Pat. No. 6,394,654.

Reference should be made to motor and bearing designs disclosed in U.S. patent application Ser. No. 09/043,065 filed Dec. 19, 1997 entitled "BOTH ENDS OPEN FLUID DYNAMIC BEARING WITH MULTIPLE THRUST PLATES" by Khan, et al, now U.S. Pat. No. 6,069,767; U.S. patent application Ser. No. 08/981,548 filed Dec. 19, 1997 entitled "BOTH ENDS OPEN FLUID DYNAMIC BEARING HAVING A JOURNAL IN COMBINATION WITH A CONICAL BEARING" by Rahman, at al. now U.S. Pat. No. 6,130,802 all of which are assigned to the assignee of this invention and are incorporated herein by reference, with which this invention is useful.

FIELD OF THE INVENTION

The present invention relates to magnetic disc storage systems and more specifically the present invention relates to an improved fluid bearing for use in a disc drive storage system.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has lead to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair races which allow a hub of a storage disc to rotate relative to a fixed member. However, ball bearing assemblies have many mechanical problems such as wear, run-out and manufacturing difficulties. Moreover, resistance to operating shock and vibration is poor, because of low damping. Thus, there has been a search for alternative bearing assemblies for use with high density magnetic storage discs.

One alternative bearing design which has been investigated is a hydrodynamic bearing. In a hydrodynamic bearing, a lubricating fluid such as air or liquid provides a bearing surface between a fixed member of the housing and a rotating member of the disc hub. In addition to air, typical lubricants include oil or ferromagnetic fluids. Hydrodynamic bearings spread the bearing interface over a large surface area in comparison with a ball bearing assembly which comprises a series of point interfaces. This is desirable because the increased bearing surface reduces wobble or run-out between the rotating and fixed members. Moreover, the use of fluid in the interface area imparts damping effects to the bearing which helps to reduce non-repeatable runout.

However, because the two surfaces which form the gap of the hydrodynamic bearing are not mechanically separated, the potential for impact always exists. Such impacts could occur when the motor supported by the bearing is at rest, or even more damaging, when a shock to the system occurs while the motor is either stopped or spinning. Over time, such impacts could wear down a region on one of the bearing surfaces, altering the pressure distribution and reducing bearing efficiency or induce catastrophic failure due to surface damage like galling. Moreover, particles could be generated by the scraping of one side against the other, which particles would continue to be carried about by the fluid. Such particles could build up over time, scraping the surfaces which define the hydrodynamic bearing, or being expelled into the region surrounding the motor where they could easily damage the disc recording surface.

In most instances, the surface incurring the most wear is the inner surface, which is touched or impacted when the opposed surface moves or sets down. Common materials to be used for the two facing surfaces are ceramic vs. ceramic; ceramic vs. metal; metal vs. metal; metal vs. soft metal (which includes both known materials such as bronze, and free machining materials which are hard metals having additives to make machining easier) or hard coated surface vs. ceramic or other metal. While soft metal is highly desirable for its ease of use, it is relatively easy to pit or dent. Thus a way to minimize or eliminate such problems is highly desirable.

SUMMARY OF THE INVENTION

Therefore, it is an object of the present invention to provide an improved hydrodynamic bearing which is resistant to wear and shock. More specifically, an objective of the invention is to provide a bearing in which the facing surfaces defining the gap resist the damage imposed by one surface contacting the other, either by the motor coming to rest, or by a shock imposed to the system.

These and other objectives of the invention are achieved by providing a lubricant coating on one or both of the facing surfaces defining the gap of the hydrodynamic bearing. The lubricant film would need to be very thin, in the range of about 10 Å to 1000 Å, to prevent the film from materially affecting the hydrodynamic bearing gap which is typically about 1–10 μm. The thin lubricant film could be a perfluoropolyether (PFPE), or a mixture of PFPE, or a phosphazine derivative. To improve the adhesion and lubricating performance, functional PFPE can be used. For a pure metallic surface like steel, phosphate esters can also be used because of its affinity with the metallic surface, e.g., ferrous. For example, the lubricant film could be PFPE, or a mixture of PFPE and a phosphazine derivative. The lubricant used should be chosen to be thermally stable, and non-reactive with the typical ambient environment. The lubricant used also has to have a very low vapor pressure so that the lubricant coating lasts for the life of the bearing, as the lubricant will be applied to the surface of the bearing only once during the manufacturing process.

As an alternative, particularly if one of the surfaces of the bearing gap is ferrous, a phosphate ester could be used. Particularly with this type of coating, the material could be quenched in the phosphate ester, providing the desired thin surface coating. A thin film of phosphate esters without quenching can also be an effective wear protective coating.

The thin lubricant film can be applied to both metallic surfaces as well as surfaces with hard coatings. The use of a hard coating allows for the usage of free machining or soft metals which are vulnerable to wear degradation, and the thin lubricant film coating protects the hard coating from wear. It should be noted that although the thin lubricant film coating is effective for both liquid and gas bearings, it is most effective for gas bearings.

DETAILED DESCRIPTION OF A PREFERRED EMBODIMENT

Figure 1:
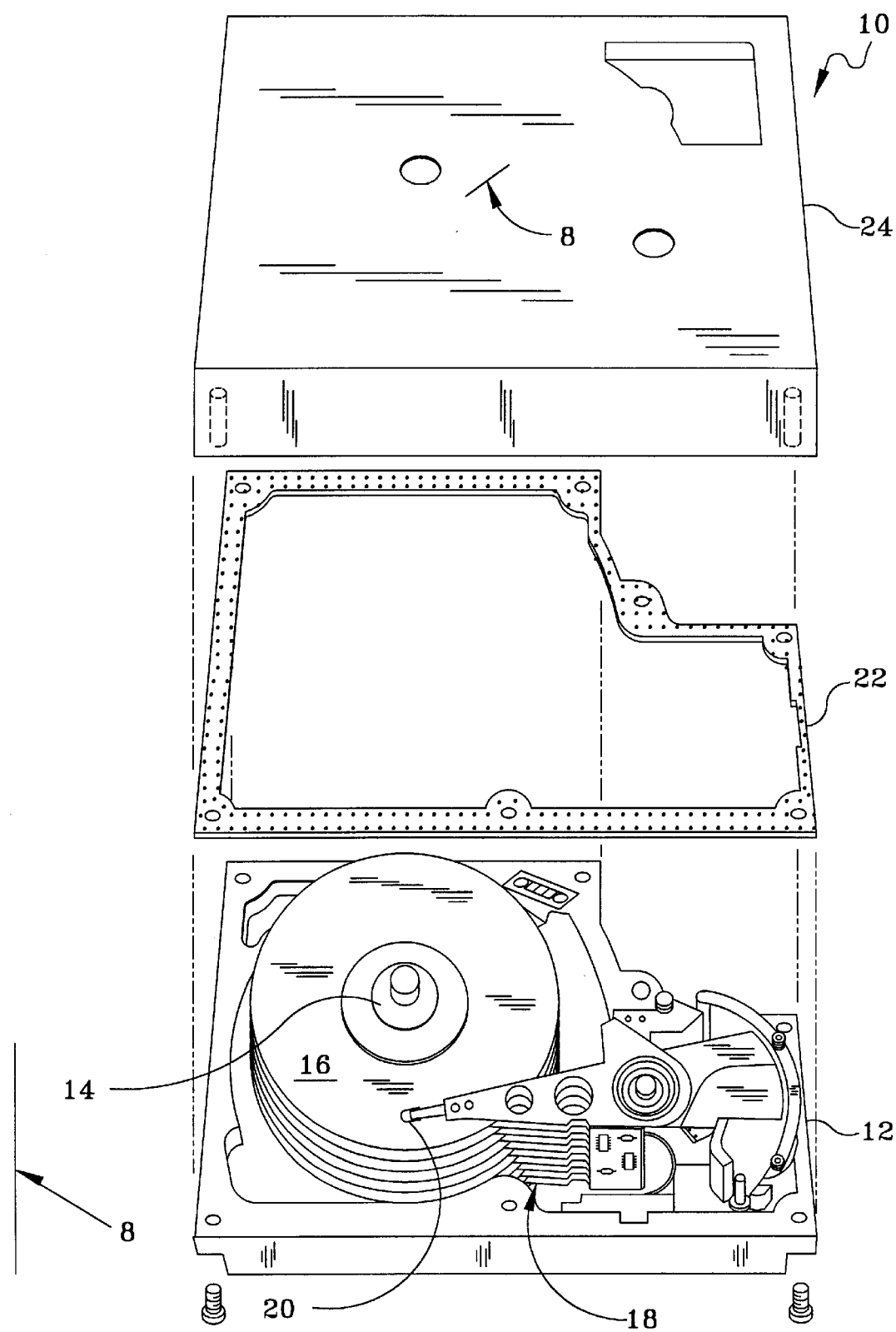
FIG. 1 is a perspective view of a magnetic disc storage system of a type which incorporates a hydrodynamic bearing cartridge in a spindle motor in accordance with the present invention.

FIG. 1 is an exploded perspective view of a magnetic disc drive storage system in which the modifications to the hydrodynamic bearing cartridge would be useful. In the example to be discussed below, the use of the hydrodynamic bearing and associated cartridge will be shown in conjunction with a spindle motor. Clearly, this bearing cartridge is not limited to use with the particular designs for hydrodynamic bearings which are shown herein and which are shown only for purposes of example. Further, the bearing cartridge is not limited to uses in a spindle motor, but could also be used to support the actuator of a disc drive for rotation. The modified bearing cartridge of this invention also has numerous other uses outside the field of disc drives.

Further, the fluid bearings discussed herein have a fixed shaft and rotating, surrounding sleeve. The present design is also useful where the sleeve is fixed and the shaft rotates.

In this particular example, the storage system 10 includes a housing base 12 having spindle motor 14 which carries storage discs 16. An armature assembly 18 moves transducers 20 across the surface of the discs 16. The environment of disc 16 is sealed by seal 22 and cover 24. In operation, discs 16 rotate at high speed while transducers 20 are positioned at any one of a large number of radially differentiated tracks on the surface of discs 16. This allows the transducers 20 to read and write magnetically encoded information on the surfaces of discs 16 at selected locations.

Figure 2:
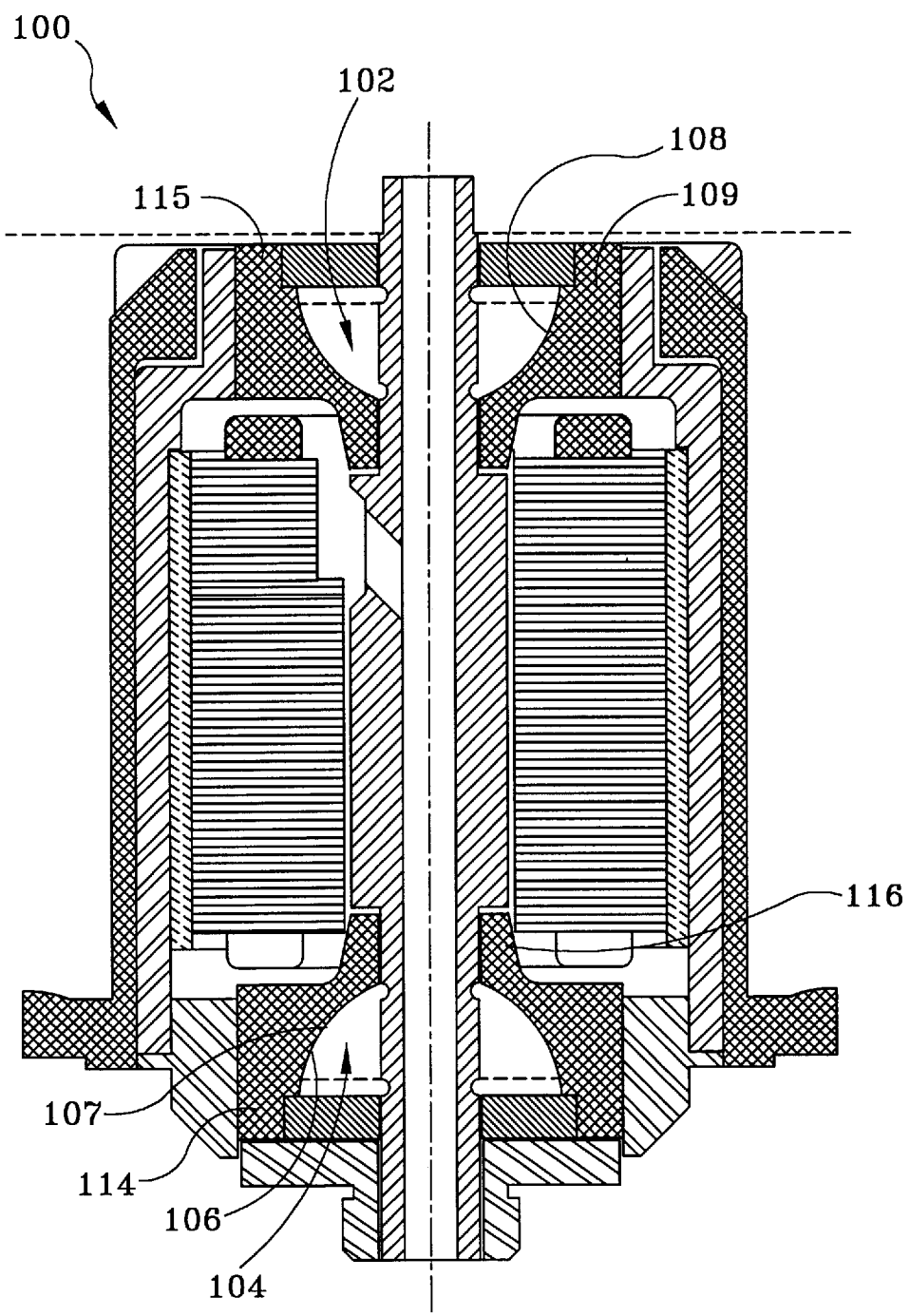
FIGS. 2–5 are vertical sectional views of hydrodynamic bearing cartridges which the present invention would be useful.

FIG. 2 is a vertical section of a typical motor 90 with upper and lower conical bearings 102, 104 having surfaces 106, 105 which define one side of a hydrodynamic bearing gap. The opposite side of each gap is defined by an inner surface 107, 109 of a sleeve or bearing holder 115, 116. Clearly, when sleeve 115, 116 is not rotating the unsupported sleeve will lean on or bump the adjacent surface 106, 108. This could chip or scar one of the surfaces, diminishing the quality of the bearing gap. Thus, according to the prior art, both surfaces must be formed of very hard materials to prevent such damage.

However, as explained in further detail below, according to the present invention the addition of a thin lubricant coating to at least one of the surfaces will prevent these effects. Further, at least one of the surfaces may be defined utilizing a free machine material to which a hard coating is applied, after which the lubricant will also be placed on the surface. Examples of specific materials will be given below.

Figure 3:
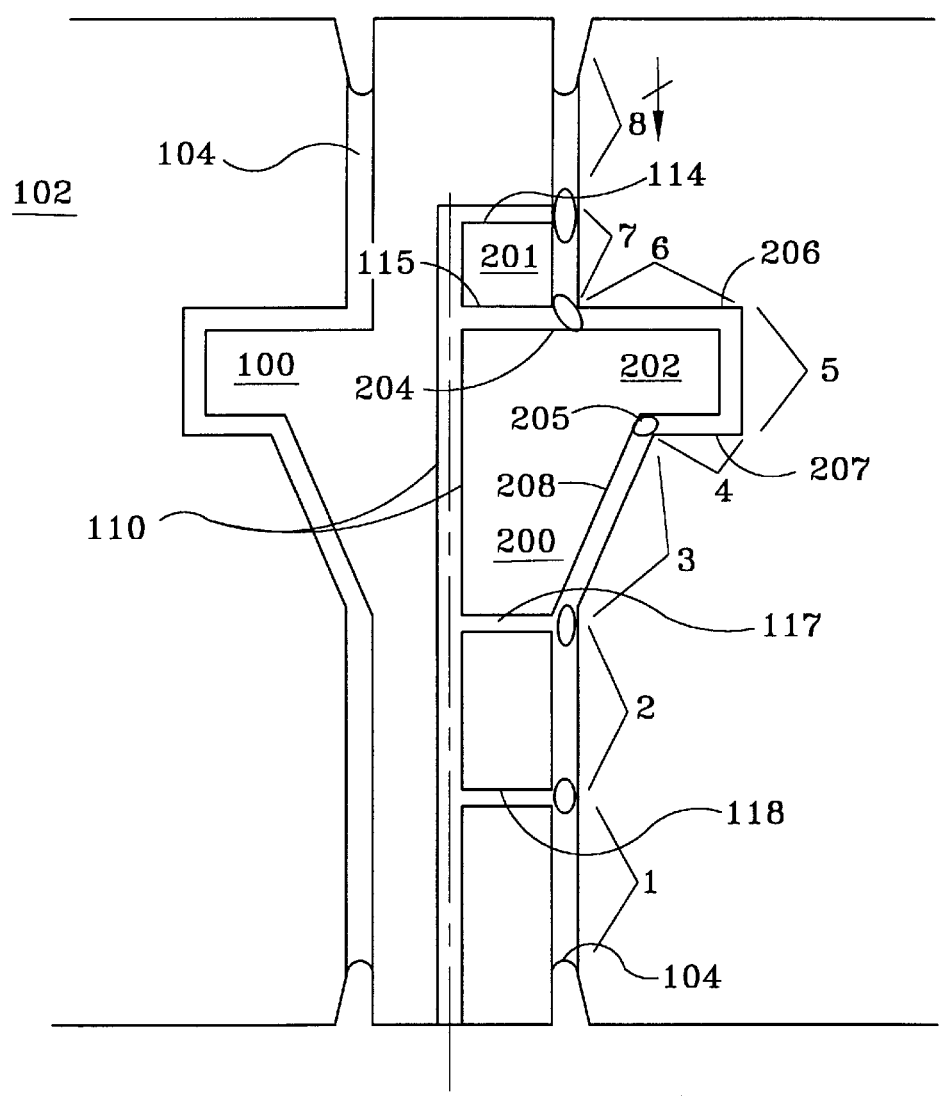

FIG. 3 is a vertical sectional view of a hydrodynamic bearings of the type disclosed in detail in the applications referenced above, and in which the present invention would typically be useful, although its utility is not limited to these designs. FIG. 3, for example, shows a hydrodynamic bearing system comprising a plurality of bearing sections 1–8. Sections 1, 2, 7 and 8 are journal bearings which define between the axial walls of the shaft 100 and the sleeve 102. Bearing section 3 is a conical bearing defined between the inclined wall section 208 of the shaft 100, and the facing wall section 210 of the sleeve 102. Sections 4 and 6 are thrust bearings defined between radial wall sections 204, 205 of the shaft, and the complementary wall sections 206, 207 of the sleeve.

It is apparent from a review of this figure that when relative rotation between the shaft 100 and sleeve 102 stops, there will be some tendency for the unsupported member of the pair to lean toward or even rest against the adjacent surface. Thus, for example, the end section 210 of the conical bearing 3 may come to rest against the corresponding section 208 of the opposed surface. Alternatively, the physical contact may occur between opposing surfaces 205, 207 of the thrust bearing 4. The important point is that as the rotation of the bearing walls stops and starts, physical contact between these opposed surfaces of one or more of the bearing sections in a complete hydrodynamic bearing may well occur. Moreover, upon startup until some speed of relative rotation has been established and the fluid pressure created between the opposing surfaces, some grinding or scraping of one surface relative to the other may well occur. This could easily produce metallic chips afloat in the fluid; alternatively it could scar or groove the surface, reducing the effectiveness of the hydrodynamic beating. Therefore, to enhance the life of these surfaces as well as prevent wear of either of the surfaces, a very thin film of lubricant can be spread over one or both of the facing surfaces. As an example, one of the parts may be coated with sputtered carbon or a DLC (diamond like carbon); the other surface would preferably be hard metal or free machining metals or a soft metal with a hard coating. This enables the designer to use free machining materials thus reducing the manufacturing costs tremendously. A free machine bearing surface without a hard coating is vulnerable to wear failure. So, a hard coating is provided to suppress that and preferably a thin film of lubricant is provided to reduce the wear of the hard coating.

Thermal mismatch of the materials also has to be considered in applying a lubricant coating to one or both of the surfaces. Thus, the desired lubricant might also be a PFPE type or a mixture of PFPE and Phosphazine or a mixture of PFPE and Phosphazine or a mixture of PFPE and wear additives (e.g., phosphate esters like triaryl and trialkyl phosphate, TCP, butylated triphenyl phosphate), or only the active portion of selected antiwear ingredients which may be incorporated in fluid bearings.

FIG. 1 displays a bucket of the invention. As can be seen from the drawing, a handle is attached to the upper lip of the structure and connected at points diametrically opposite each other on the circumference.

Functional PFPE has reactive end groups which try to adhere with the surface or surfaces to be coated. Thus, the protective lubricant layer against wear is easily established. These types of lubricant coatings are also very thermally stable and nonreactive with the ambient environment. The application process can be done by dipping the parts in a solution of lubricant and CFC-type solvent. If the objective is to use a more environmentally friendly solvent like hexane, a different type of lubricating fluid such as a phosphazine type can be used as lubricant, as this also has substantial antiwear properties.

An alternative improvement would be utilized if one of the surfaces of the sleeve 102 or shaft 100 is ferrous. Phosphate esters are reactive with ferrous surfaces, and can be used to deposit protective films that significantly reduce wear. These types of antiwear films are useful in lengthening component life, thus reducing wear during start-stop conditions or during run-in.

The same principles can be applied for hydrodynamic bearings which utilize steel surfaces and liquid lubricants. In this case, the lubricant coating process could be carried out in many ways, with the most practical being quenching the metal in phosphate esters.

Figure 4:
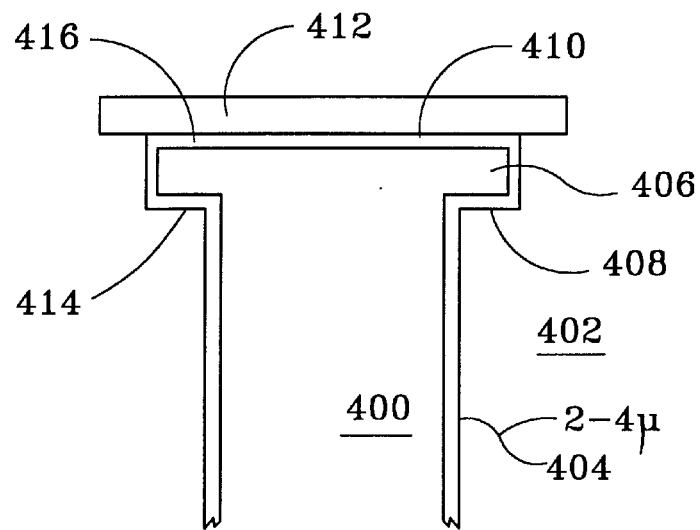
Figure 5:
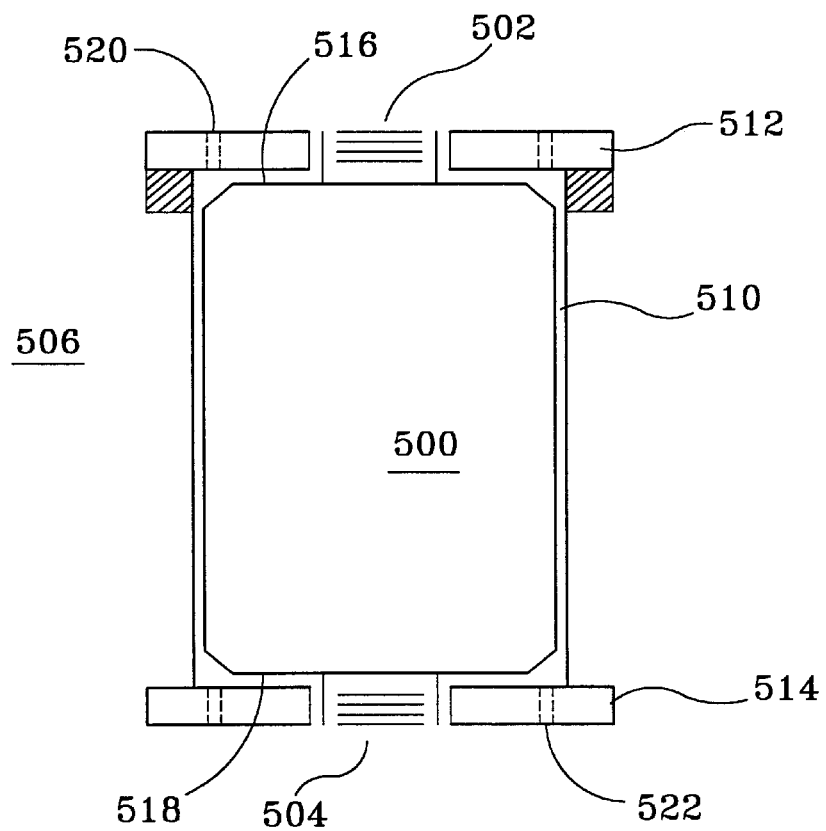

The same principles can also be applied to hydrodynamic bearings of other designs as shown, for example, in FIGS. 4 and 5. FIG. 4 shows a very simple form of single plate hydrodynamic bearing in which the liquid and gas combination is especially useful. In this embodiment, which incorporates a relatively large diameter shaft 400 surrounded by a sleeve 402, the journal bearing which would typically be an air bearing would have a gap 404 of about 2–4 μm. This gap 404 is relatively narrow compared to the gap 414, 416 for the liquid bearing, which gap is defined between the thrust plate 406 and a radial wall 408 of the sleeve on one side and a surface 410 of counterplate 412 on the other side. This gap 414, 416 has a spacing of 7–8 μm; it is 2 to 4 times wider than the air or gas bearing gap 404.

A further alternative appears in FIG. 5 which also has a shaft 500 of a relatively large diameter. In the case shown in FIG. 5, the shaft is fixed at both ends by attachment extensions 502, 504. The sleeve 506 rotates around the shaft 500 and defines in part a journal bearing 510 which may have a gap of about 2–4 μm and is typically filled with gas or air. A thrust plate 512, 514 is mounted at each end of the sleeve and defines a gap 516, 518 with a radial surface of the shaft 500. This gap would typically be 6–8 μm; and the gap 516, 518 can be filled in either instance or in both instances with liquid, with the fluid being placed in one or both gaps to be optimized for power consumption. It should be noted that in this embodiment a groove 520, 522 can be incorporated in each of the thrust plates 512, 514 respectively to enforce a separation boundary between the liquid which fills the thrust bearing and the gas which fills the journal bearing 510.

In both cases, it is apparent that the present invention would be of great value. The gap is very small, making physical contact likely. Further, in many cases only gas or air fills the gap, reducing the cushioning effect which would be provided by a liquid. Thus the importance of using this invention.

Other features and advantages of the present invention will become apparent to a person of skill in the art who studies the present invention disclosure. Therefore, the scope of the present invention is to be limited only by the following claims.

What is claimed is:

1. A hydrodynamic bearing comprising a shaft having an exterior surface, a sleeve having an interior surface surrounding said the shaft and defining a gap between said the exterior surface of the shaft and seed the interior surface of the sleeve substantially filled with a gas fluid to support relative rotation of the shaft and the sleeve, and a liquid lubricant coating having a thickness of about 10 Å to about 1000 Å at least partially coated on at least one of the exterior surface and the interior surface to resist wear during contact between said the exterior surface of the shaft and sold the interior surface of the sleeve.

2. The hydrodynamic bearing of claim 1 further comprising a wear resistant carbon coating, wherein at least one of the exterior surface and the interior surface is at least partially coated with the wear resistant carbon coating.

3. The hydrodynamic bearing of claim 1 wherein at least one of the exterior surface and the interior surface comprises a material selected from the group consisting of steel, DLC, or $Al_2O_3$—TiC, SiN, SiC, and TiN.

4. The hydrodynamic bearing of claim 1 further comprises a wear resistant coating comprising carbon on at least one of the exterior surface and the interior surface, wherein the at least one of the exterior surface and the interior surface comprises at least one at bronze and free machining metals.

5. The hydrodynamic bearing of claim 1 further comprises a hard coating comprising a material selected from the group consisting of DLC, or $Al_2O_3$—TiC, SiN, SiC, and TiN, the hard coating formed on at least one of the exterior surface and the interior surface, wherein the at least one of the exterior surface and the interior surface comprises a metal having a hardness less than the hard coating.

6. The hydrodynamic bearing of claim 1 wherein at least one of the shaft and the sleeve is made of steel, and the liquid lubricant coating is formed by quenching the at least one the shaft and the sleeve in a phosphate ester.

7. The hydrodynamic bearing of claim 1 wherein the at least one of the exterior surface and the interior surface comprises ferrous metal, and the liquid lubricant coating comprises phosphate ester.

8. The hydrodynamic bearing of claim 1 wherein the liquid lubricant coating is selected from the group consisting of PFPE, functional PFPE, phosphazine, phosphate ester, a mixture of PFPE and phosphazine, a mixture of PFPE and an additive selected from the group consisting of phosphate ester, triaryl phosphate, trialkyl phosphates, TCP and butylated triphenyl phosphate.

9. The hydrodynamic bearing of claim 1 wherein the liquid lubricant coating at least partially coated on at least one of the exterior surface and the interior surface is formed by dipping at least a portion of the at least one of the exterior the interior surface in a lubricant.

10. The hydrodynamic bearing of claim 1 wherein at least one of the exterior surface and the interior surface comprises anodized metal.

11. The hydrodynamic bearing of claim 1 further comprises a hard coating formed on at least one of the exterior surface and the interior surface comprises a metal having a hardness less than the hard coating, and wherein the liquid lubricant coating is at least partially coated on the surface of the hard coating.

12. A hydrodynamic bearing comprising a shaft, a sleeve surrounding the shaft and defining a gap between the shaft and said the sleeve substantially filled with a gas fluid to support relative rotation of said the shaft and the sleeve, and at least one of the surfaces of the shaft and the sleeve having lubricating means thereon to resist wear of the shaft and the sleeve upon contact between the shaft and the sleeve.

13. The hydrodynamic bearing of claim 12 wherein the liquid lubricant means comprises a liquid lubricant coating having a thickness of about 10 Å to about 1000 Å.

14. The hydrodynamic bearing of claim 13 wherein the liquid lubricant coating is selected from the group consisting of PFPE, functional PFPE, phosphazine, phosphate ester, a mixture of PFPE and phosphazine, a mixture of PFPE and al additive selected from the group consisting of phosphate ester, triaryl phosphate, trialkyl phosphate, TCP, and butylated triphenyl phosphate.

15. The hydrodynamic bearing of claim 14 further comprising a wear resistant carbon coating, wherein at least one of the surfaces of the shaft and the sleeve is at least partially coated with the wear resistant carbon coating, and wherein the wear resistant carbon coating is at least partially coated with the liquid lubricant coating.

16. The hydrodynamic bearing of claim 15 wherein the liquid lubricant coating is formed by dip coating.

17. The hydrodynamic bearing of claim 14 further comprising a hard coating formed on the at least one of the surfaces of the shaft and the sleeve, wherein the at least one of the surfaces of the shaft and the sleeve comprises a metal having a hardness less than the hard coating, and wherein the liquid lubricant coating is at least partially coated on the surface of the hard coating.

18. The hydrodynamic bearing of claim 17 wherein the metal is at least one of bronze and free machining metals.

19. The hydrodynamic bearing of claim 17 further comprising a wear resistant carbon coating, wherein the hard coating is at least partially coated with the wear resistant carbon coating, and wherein the wear resistant carbon coating is at least partially coated with the liquid lubricant coating.

20. The hydrodynamic bearing of claim 17 wherein the liquid lubricant coating is formed by dip coating.

* * * * *